J. N. WILKINS.
Saw Planer.
No. 18,114. Patented Sept. 1, 1857.
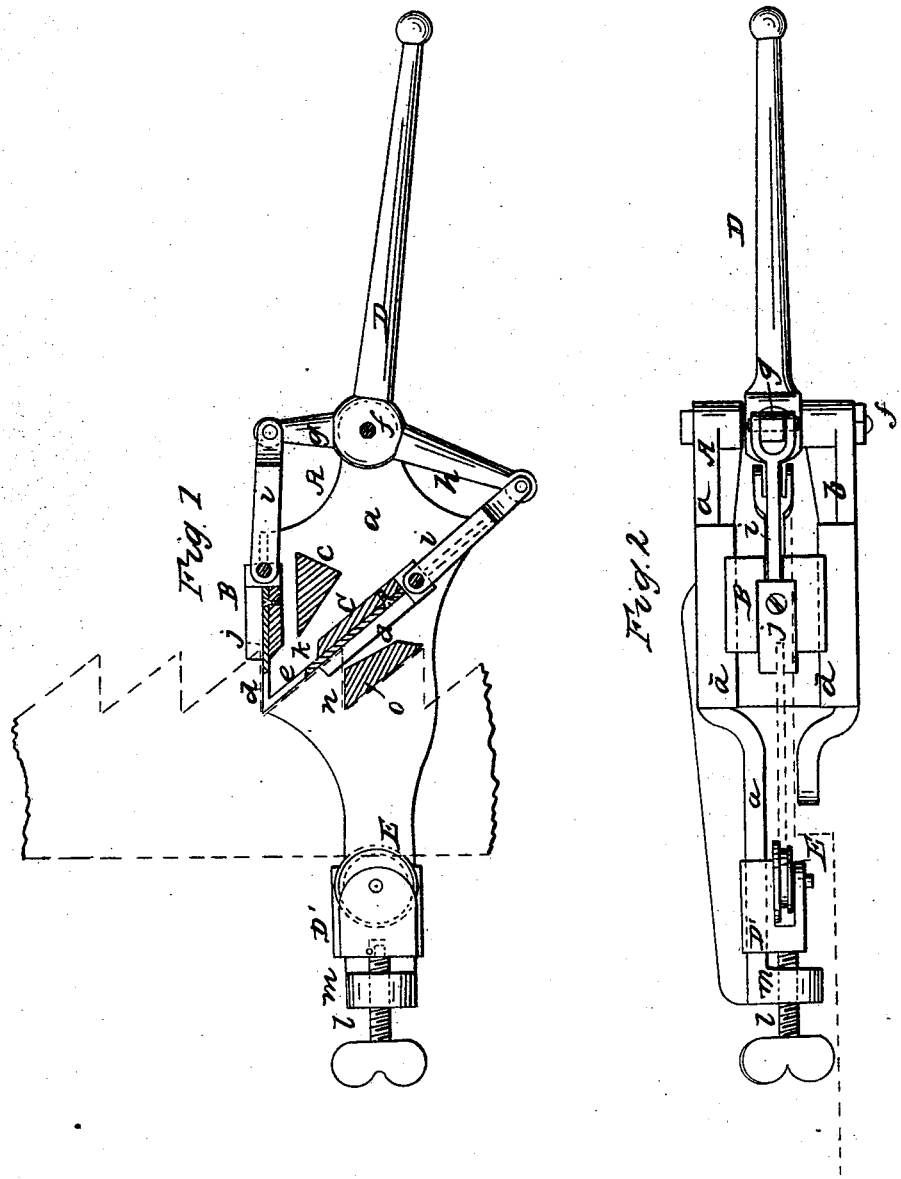

UNITED STATES PATENT OFFICE.

JOHN N. WILKINS, OF WAUKEGAN, ILLINOIS.

MACHINE FOR PLANING SAW-TEETH.

Specification of Letters Patent No. 18,114, dated September 1, 1857.

*To all whom it may concern:*

Be it known that I, JOHN N. WILKINS, of Waukegan, in the county of Lake and State of Illinois, have invented a new and Improved Device for Planing Saw-Teeth; and I do hereby declare that the following is a full, clear, and exact description of the same, reference being had to the annexed drawings, making a part of this specification, in which—

Figure 1, is a side sectional view of my improvement applied to a saw. Fig. 2, is a plan or top view of ditto.

Similar letters of reference indicate corresponding parts in the two figures.

This invention consists in the employment or use of two reciprocating planes, operated as will be hereinafter fully shown and described, and placed within a suitable case which is attached to the saw, the whole being arranged so that both edges of the saw teeth may be planed in an expeditious and perfect manner and the saw therefore kept in perfect working order, with but little trouble and expense.

To enable those skilled in the art to make and use my invention, I will proceed to describe its construction and the way in which it is used.

A represents the case of the implement or device which is of cast metal and formed of two parallel plates (a) (b) connected by cross pieces (c) (d). On the inner side of each plate (a) (b) two guides (d) (e) are formed. The guides (d) are horizontal as shown clearly in Fig. 1, and a slide B is fitted between them. The guides (e) are inclined and a slide C is fitted between them. The guides (d) (e) are simply projections, ledges cast with the plates (a) (b).

D is a lever which works on a rod (f), said rod passing transversely through the front ends of the plates (a) (b). The inner end of the lever D has two arms (g) (h) attached to it, and these arms are connected to the slides B, C, by rods (i) which are pivoted to the slides and arms.

In each slide B, C, a cutter or planer is fitted, the cutter (j) in the slide B has its lower side beveled to form a cutting edge, but the cutter (k) in the slide C has its upper side beveled to form the cutting edge, see Fig. 1. The plate (a) of the case A is considerably longer than the plate (b) and the portion that projects beyond the plate (b) is made quite narrow compared with the other portion and said narrow portion has a slide D' fitted thereon. This slide has a roller E fitted in it and the slide D is adjusted on the plate (a) by means of a set screw (b) which passes through a nut (m) formed on the end of plate (a).

The device is used as follows. The crosspiece (d) has its upper and outer sides made to correspond in form to the spaces between the saw teeth, that is the upper surface (n) of the crosspiece (d) corresponds with the proper form of the under edges of the teeth, and the outer surface (o) corresponds with the proper inclination of the upper edges of the teeth, see Fig. 1, in which the saw is shown in red, and the lowest recess of the saw is filed by hand in proper form so that the cross piece (d) will fit snugly thereon, the case A being adjusted snugly to the saw by pressing the roller E against its back edge. The lever D is then worked up and down by hand and the two cutters (j) (k) are moved back and forth the upper cutter (j) planing the lower edges of the teeth which is immediately above the one which bears on the cross piece (d), and the cutter (k) planing the front edges of the teeth which bear on the crosspiece (d). By filing the lowest recess in proper form a guide is obtained for the proper cutting of all the teeth, for the crosspiece (d) which is of proper form, that is its two edges or surfaces (n) (o) correspond relatively with the lower and front edges of the teeth and as the guides (d) (e) of the cutters (j) (k) are parallel respectively with the sides or surfaces (n) (o) of the cross piece (d) it follows as a matter of course that the edges of the several teeth will be planed in proper form. The implement or device is raised on the saw, one tooth at a time as the work progresses, the screw (l) being relaxed in order that the device may be moved.

By this simple improvement or device the teeth of a saw may always be kept in proper working order with but little trouble and expense the edges of the teeth being, as soon as they become rounded by use, cut perfectly straight and the point of the teeth brought to a sharp cutting edge.

Having thus described my invention what I claim as new and desire to secure by Letters Patent, is—

The two planes or cutters (*j*), (*k*) fitted within the case A and operated as shown in combination with the guide or cross piece (*d*) within the case, the whole being arranged and applied to the saw as shown for the purpose set forth.

JOHN N. WILKINS.

Witnesses:
Wm. E. Lowell,
Oscar G. Blaisdell.